United States Patent
Airheart

[15] 3,690,417
[45] Sept. 12, 1972

[54] WEAR COMPENSATED, FORCE MULTIPLYING DISC BRAKE

[72] Inventor: Franklin B. Airheart, Los Angeles, Calif.

[73] Assignee: Airheart Products, Incorporated, Sylmar, Calif.

[22] Filed: Jan. 28, 1971

[21] Appl. No.: 110,384

[52] U.S. Cl..................................188/71.8, 188/72.6
[51] Int. Cl................................................F16d 55/02
[58] Field of Search.......188/71.8, 71.7, 72.6, 196 B, 188/196 C, 79.5 K, 79.5 GC

[56] References Cited

UNITED STATES PATENTS

| | | | |
|---|---|---|---|
| 3,365,029 | 1/1968 | Swift | 188/71.8 |
| 3,217,841 | 11/1965 | Dotto et al | 188/71.7 |

*Primary Examiner*—Joseph Wegbreit
*Attorney*—White, Haefliger & Bachand

[57] ABSTRACT

A disc brake assembly includes, in combination:
 a. actuator means to apply external force,
 b. braking structure movable toward and away from a side of the disc, and
 c. force transmitting means including a lever having coupling to said braking structure to provide mechanical advantage of force transmission from the actuator means to the braking structure to urge said structure against the disc in response to lever pivoting,
 d. said means including a motion adjustor for shifting said coupling to compensate said force transmitting means for wear of the braking structure.

29 Claims, 9 Drawing Figures

INVENTOR.
FRANKLIN B. AIRHEART
BY
White, Haefliger & Bachand
ATTORNEYS.

WEAR COMPENSATED, FORCE MULTIPLYING DISC BRAKE

BACKGROUND OF THE INVENTION

This invention relates generally to friction braking apparatus, and more particularly concerns unusually advantageous means to compensate for disc brake wear and to effect mechanical advantage in force transmission to disc braking structure.

Many vehicle braking systems, particularly as employed on trucks and buses, use air pressure, as for example at 120 p.s.i., to displace the actuator piston for effecting braking. It has long been recognized that such systems present certain disadvantages. Among these are the relatively large size of the piston required to develop necessary braking force and the latter being a function of the product of the piston area and the air pressure. While principles of mechanical advantage may be employed to increase the braking force, the stroke of the large piston is undesirably increased when the brake lining wears, so that the required size of air actuated systems for vehicle disc braking presents serious space and cost problems. Efforts to ameliorate such problems have not to my knowledge resulted in solutions embodying the unusual advantages in structure, function and result as applied to disc brakes now made possible by the present invention.

SUMMARY OF THE INVENTION

It is a major object of the present invention to provide highly advantageous equipment characterized as overcoming the problems referred to above as well as other encountered in this environment. As will appear, the invention affords the use of mechanical advantage without increased size of the equipment, enabling the provision of relatively small-size air brakes for use on trucks and other vehicles.

Basically, apparatus incorporating the invention comprise actuator means to apply external force; braking structure movable toward and away from a side of a rotary disc connected with a vehicle wheel; and force transmitting means including a lever or levers having coupling to the braking structure to provide mechanical advantage of force transmission from the actuator to the braking structure to urge the latter against the disc in response to lever pivoting; the force transmitting means also including a motion adjuster for shifting the coupling to compensate the force transmitting means for wear of the brake structure. As a result, the actuator which typically is pneumatically operated need not increase its power stroke as the brake pad or pads wear. As will be seen, the adjustor may be located in the direct path of force transmission from the lever or levers to the brake pads, or it may be located outside that path yet remain operatively coupled to the lever or levers.

Further, the force transmitting means may include a lever having a first pivot and operable to provide mechanical advantage of force transmission from the actuator means to the braking structure to urge the latter against the disc in response to lever pivoting; and, means to effect shifting of the lever pivot in a direction to compensate the force transmitting means for wear of the braking structure. Typically, the lever is pivotable in brake advancing and retracting directions and the lever pivot shifting means may include mechanism operable to restrain retraction of the brake in response to lever pivoting in a retraction direction. Also, the lever may be operatively connected to the brake structure at a second pivot spaced from the first pivot and characterized in that the first pivot acts as a fulcrum when the lever pivots in an advancing direction, and the second pivot acts as a lever fulcrum when the lever pivots in a retraction direction with the mechanism then restraining brake structure retraction. As will be seen, the adjustor may effect shifting of the first pivot.

Other objects and advantages of the invention include the provision of a caliper carrying the lever, brake structure and adjuster, the caliper forming a space in which the brake disc is adapted to extend; the provision of other brake structure on the caliper and at the opposite side of the disc to engage the latter when the caliper shifts laterally in response to engagement of the disc by the first brake; the provision of an air pressure responsive actuator carried by the caliper; and the provision of other features as will appear.

These and other objects and advantages of the invention, as well as the details of illustrative embodiments, will be more fully understood from the following specification and drawings, in which:

DESCRIPTION OF PREFERRED EMBODIMENTS

Figures 1, 3:
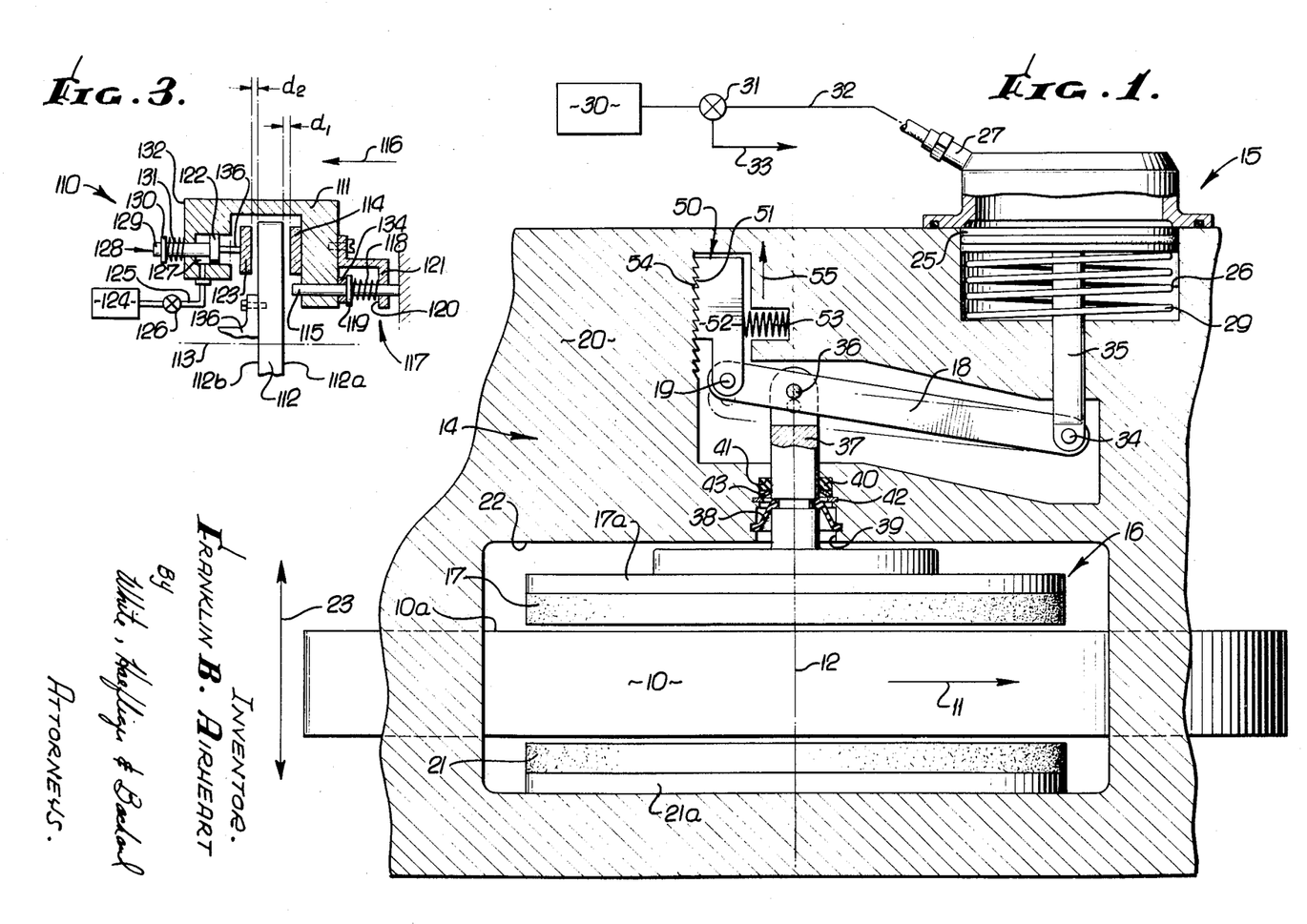
FIG. 1 is a plan view of apparatus incorporating the invention.
FIG. 3 is a section illustrating the environment of an application of the invention.

In FIG. 1, a disc or rotor is shown at 10 as rotating in the direction of arrow 11, and about an axis 12.

The disc braking apparatus or assembly 14 includes actuator means to apply external force, one form of which means is shown at 15; braking structure (as for example at 16) including a brake lining 17, movable toward and away from the side 10a of the disc; force transmitting means including a lever 18 having a pivot 19 and operable to provide mechanical advantage of force transmission from the actuator means to the braking structure to urge the latter against the disc in response to lever pivoting; and means to effect shifting of the lever pivot 19 in a direction to compensate for wear of the braking structure. In this regard, the above elements may with unusual advantage be carried by a caliper housing 20 forming an opening 22 into which the brake pad including lining 17 and mount 17a are received. In such event, a second pad including lining 21 and mount 21a are also received in opening 22 at the opposite side of the disc. Mount 21a may be directly carried by or attached to the caliper 20 to accommodate lateral shifting thereof, as indicated by arrows 23, in response to engagement of lining 17 with the disc, whereby both linings may engage the disc. Caliper 20 may be suitably carried to accomodate such shifting.

It will be noted that the lever 18 is pivotable clockwise about pivot 19 in braking structure advancing direction, as for example in response to operation of the actuator means in the form of an air pressure actuated piston 25. The latter may work in a cylinder 26 integral with the caliper, air pressure being admitted to the cylinder at 27 to urge the piston in a brake advancing direction as described. While the use of air pressure is described since the invention is particularly well adapted to such usage, it is also contemplated that other gaseous or liquid pressure transmitting media may be employed.

The lever 18 is alternatively pivotable counterclockwise in FIG. 1 about pivot 19 in braking structure retracting direction, as for example in response to return force exertion on the piston 25 by a compression spring 29 housed in the cylinder 26 as shown, and when the spring force overcomes the fluid pressure exertion on the opposite side of the piston. A source of fluid pressure is indicated at 30 and a three-way control valve 31 in line 32 controls pressure application from the source to the piston, and pressure venting from the cylinder at 33.

The lever 18, its pivotal connection at 34 to the piston rod 35, and its pivotal connection at 36 to the brake rod 37 may all be protectively housed or enclosed by the caliper body to prevent dust particle access to these elements. An annular dirt seal 38 seals off between rod 37 and the bore 39 in the caliper body through which rod 37 projects from pivot 36 to the braking structure. Elements 34–37 and the lever 18 may all be considered as included within one unusually advantageous force transmitting means, as referred to above.

Coming now to an important aspect of the invention, the purpose for the above referred to means to effect shifting of the lever pivot 19 in a direction to compensate the force transmitting means for wear of the braking structure is to allow the piston 25 to travel through a stroke or strokes which do not increase to great extent despite wear of the lining 17, or linings 17 and 21, all while substantial force multiplication is effected via the lever 18 for maximum braking effect. As a result, the size of the actuator piston and cylinder may be kept to a minimum, enabling practical use of the apparatus, and particularly when air pressure actuated, over a greatly extended range of applications, as for example on air actuated truck and bus brakes.

Such referred to means typically may include mechanism operable to restrain retraction of the braking structure away from the disc in response to lever pivoting in a retracting direction, as described. In the embodiment shown, the referred to mechanism is shown to include a grip element in the form of a ring 40 frictionally gripping the rod part 37 to limit its retraction by engagement with a bore shoulder 41 formed by the caliper body, or equivalent housing. In this regard, ring 40 may move forwardly with the rod until limited by stop ring 42 carried by the body, and a retraction spring 43 urges the ring 40 in a retraction direction to carry the braking structure away from the disc after braking force is relieved. Thus, ring 40 may advance until limited by stop 42, and retract until it engages shoulder 41. As the brake lining wears, the braking structure must be displaced further toward the disc to effect braking. Ring 40 accomodates this by permitting frictional slippage of the rod 37 in response to sufficient braking force exertion by the lever 18.

Accordingly, as the brake wears, the retracted position of the pivot 36 is progressively advanced toward the disc. As a result, it will be noted that the pivots 19 and 36 are characterized in that the pivot 19 acts as a lever fulchrum when the lever pivots in a brake element advancing direction (i.e. toward the disc), whereas the pivot 36 acts as a fulchrum when the lever pivots in a brake element retracting direction.

The means to effect shifting of the first pivot, i.e. pivot 19, typically comprises an adjuster responsive to lever pivoting in the retracting direction, one such adjuster being the ratchet indicated at 50 in FIG. 1. It is shown to have teeth 51 on a body 52 urged by spring 53 into mesh with teeth 54 on the caliper, to resist displacement of the body 52 in the direction of arrow 55. Since the body 52 is connected to the pivot 19, it is displaced in response to lever pivoting in a retraction direction as accomodated by the cam angularity of the teeth 51 and 54.

In operation, as the piston 25 is displaced by fluid pressure, the lever pivots clockwise with the adjustor holding the pivot 19 in position to act as a fulchrum, force being applied with mechanical advantage to the brake. If movement of the brake toward the disc exceeds the "retraction" range of movement of the grip ring, the rod 37 moves through the grip ring until full braking force is applied to the disc.

On release of the brake, the piston 25 is returned by spring 29, pivoting the lever in a retraction mode. Concurrently, the braking element 16 is retracted by Belleville spring 43 acting on the grip ring to retract it toward and against the shoulder 41. The pivot 36 now becomes a fulcrum for the lever, and the adjuster is pulled or "ratcheted" to a new position. Such action continues throughout the life of the lining, keeping the brake properly adjusted. To reline the brake, the adjuster and brake element are returned to original position, and the linings replaced.

While adjustor 52 is shown as a ratchet, to adjust automatically, a manually operable adjustor may also be used.

Figures 2, 9:
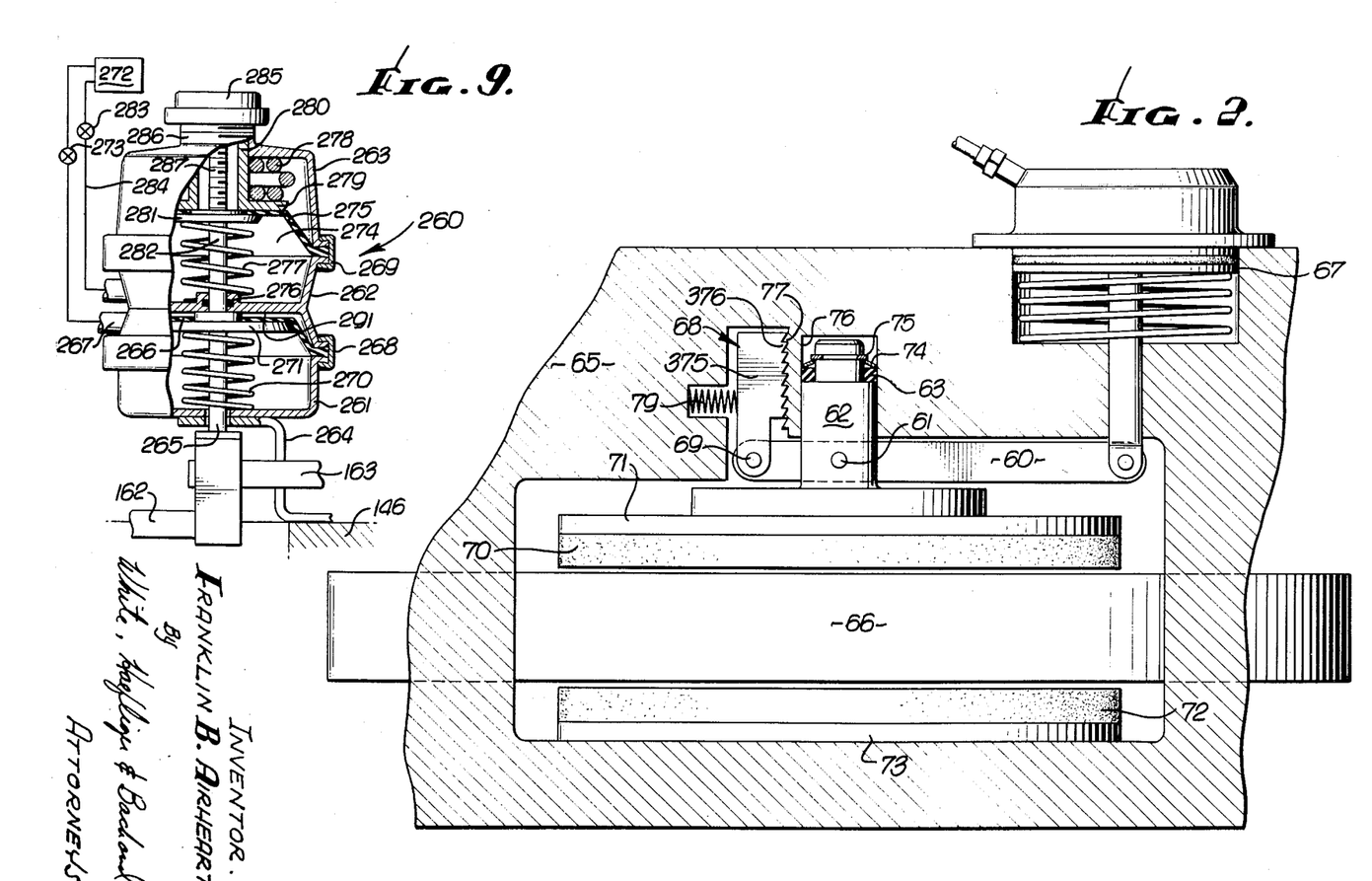
FIG. 2 is a plan view of modified apparatus incorporating the invention.
FIG. 9 is a section showing a substitute actuator.

The modified apparatus of FIG. 2 is similar to that shown in FIG. 1, excepting that the lever 60 is pivot connected at 61 to the rod 62 (which corresponds to rod 37 in FIG. 1), the grip ring 63 being located at the opposite side of the lever with respect to the brake lining 70. This provides a more compact mechanism, including the caliper 65. The disc and actuator piston appear at 66 and 67 respectively, and the adjustor 68 is pivot connected to the lever at 69. Lining 70 is carried by the rod 62 via plate 71, and lining 72 is attached to the caliper via plate 73. Belleville spring 74 urges the rod 62 in a retraction direction via ring 75 attached to the rod. Grip ring 63 frictionally grips the bore 76, and is shifted toward disc 66 only upon sufficient wear of lining 70 as to exceed the deflection range of the Belleville spring 74. Teeth 376 on body 375 engage the teeth 77 on the caliper in response to force exertion by spring 73, their ratcheting mode of operation being the same as in FIG. 1.

Referring to FIG. 3 (showing an environment in which the invention is particularly useful) the illustrated disc brake assembly 110 includes a caliper 111 adapted to straddle the rotary disc 112 during the disc rotation relative to the caliper and about axis 113; a braking element (as for example pad 114) carried by the caliper to face one side of the disc; means (as for example fixed shaft 115) mounting the caliper to shift in one direction (see arrow 116) in order to bring the braking element into braking engagement with one side face 112a of the disc in response to actuating force exertion on the caliper; and retractor means generally indicated at 117 carried to resist such shifting of the caliper and to displace the caliper in the opposite direction to carry the braking element out of engagement with the disc in response to reduction of actuating force exertion. In this regard, the retractor means 117 includes a compression spring 118 operatively connected between shaft 115 and the caliper to be compressed in response to caliper shifting in the direction of arrow 116. Note that spring 118 is held endwise between a part (as for example washer 119) on the shaft, and a shoulder 120 integral with the caliper, as for example via bracket 121.

Also shown in FIG. 3 is an actuator, as for example piston 122, carried by the caliper and another braking element, as for example pad 123, carried to be operable by the actuator to engage the opposite side 112b of the disc, whereby the actuator then exerts the previously mentioned actuating force on the caliper. For example, when fluid pressure from source 124 is transmitted via line 125 and valve 126 to the cylinder 127, the piston 122 is urged to the right to engage pad 123 with the disc 112 by means of lever 136 operatively coupled between the piston and pad 123. Reaction force transmitted by the fluid pressure on the caliper urges the latter to the left until pad 114 engages the disc 112, so that both pads then frictionally grip opposite sides of the disc with braking effect. Such shifting of the caliper results in compression of spring 118. Upon release of pressure application, the caliper 111 and pad 114 automatically retract a predetermined distance $d_1$ to the right in response to expansion of spring 118, whereby the pad 114 is held out of engagement with the disc until such time as the brake is again actuated. Also, the pad 123 is automatically retracted a predetermined distance $d_1$ plus $d_2$ to left, as by means of retractor mechanism 128, to compensate for the rightward movement $d_1$ of the caliper and to carry the pad 123 out of engagement with the disc until such time as the brake is again actuated. Retractor mechanism 128 may be similar to that shown at 117, and includes a shaft 129 integral with piston 122, a washer 130 on the shaft, and a compression spring 131 retained between the washer and the face 132 of the caliper. Accordingly, when fluid pressure exerted on piston 122 is relieved, the elements shift to positions such as seen in FIG. 2, with pads 123 and 114 held out of engagement with disc 112 despite incidental inertial loading as may occur upon turning of the vehicle, etc. Part 134 blocks rightward caliper movement. Vehicle wheel structure 136 carries the braking disc 112.

Referring now to FIGS. 4-9, the illustrated brake assembly 139 includes elements functioning in the manner as described in connection with FIG. 3, as well as additional unusually advantageous elements and modes of operation. Vehicle wheel structure (not shown) is mounted on a shaft which turns about axis 143, and attachment structure connects a braking disc 145 to the shaft.

The assembly 139 includes a caliper 146 straddling the disc 145, braking element or pad 147 carried by the caliper to face one side 145a of the disc; means mounting the caliper to shift in one direction (see arrow 148) in order to bring braking elements 147 into braking engagement with disc side face 145a in response to actuating force exertion on the caliper; and retractor means carried to resist such shifting of the caliper and to displace the latter in the opposite direction to carry the pads 147 out of disc engagement in response to reduction of actuating force exertion. In this regard, the mounting means includes a pair of parallel shafts 150 (corresponding to shaft 115 in FIG. 3) extending outwardly of the disc periphery and at locations at opposite sides of axis 143 and non-rotary axle 149. Thus, the shafts may be spaced about the axis 143 at any included angle. The shafts are integral with oppositely extending torque arms 151 projecting from a hub 152 bolted at 153 to the axle flange 154. The torque arms are connected to the shafts 150.

By locating the fixed shafts 150 at opposite sides of the axle 143, the L-shaped caliper body 146 is enabled to be supported by the shafts 150 and torque arms 151 in a balanced condition. This further facilitates the use of two brake structures generally indicated as housed at 155 and 156 on the caliper body 146.

That form of the invention shown in FIGS. 4-9 includes actuator means to apply external force (one such actuator being generally illustrated at 160 in FIGS. 4-6); braking structure movable toward and away from a side of the disc (see for example pads 161 carried by plates 162 adjacent disc side 145b, and at each of the two locations 155 and 156); and force transmitting means including a lever or levers having coupling to the braking structure or structures to provide mechanical advantage of force transmission from the actuator means to such structures, to urge the latter against the disc in response to lever pivoting. In addition and as previously described the force transmitting means may include a motion adjustor for shifting the coupling to compensate the force transmitting means for wear of the braking structure. In this regard, the adjustor may with unusual advantage include relatively movable parts in the direct path of force transmission from the lever to the braking structure.

Figures 4, 7, 8:
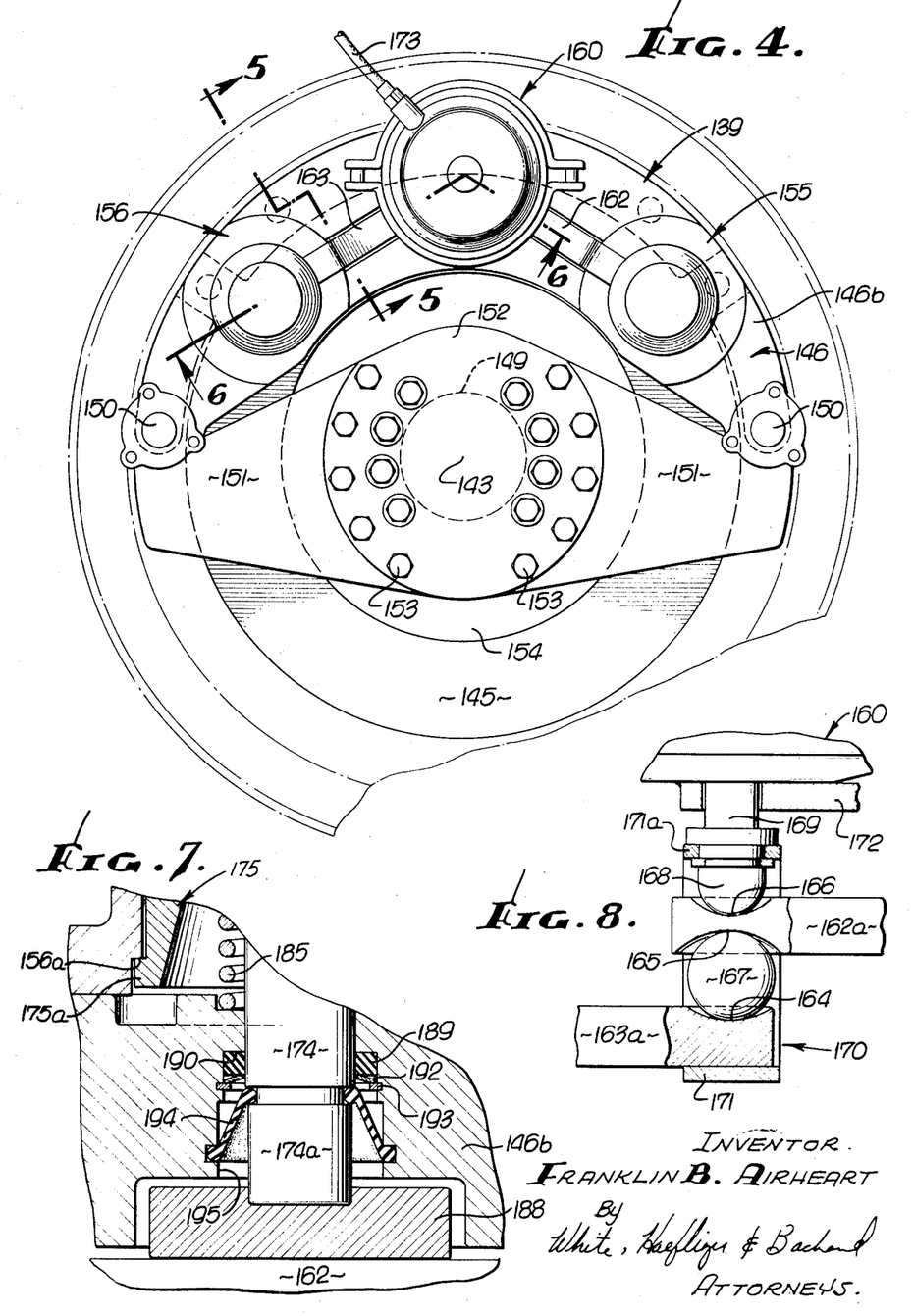
FIG. 4 illustrates an application of the invention, in FIG. 3 type environment.
FIG. 7 is a fragmentary enlarged section showing FIG. 6 structure.
FIG. 8 is a fragmentary enlarged section showing FIG. 6 structure.
Figure 6:
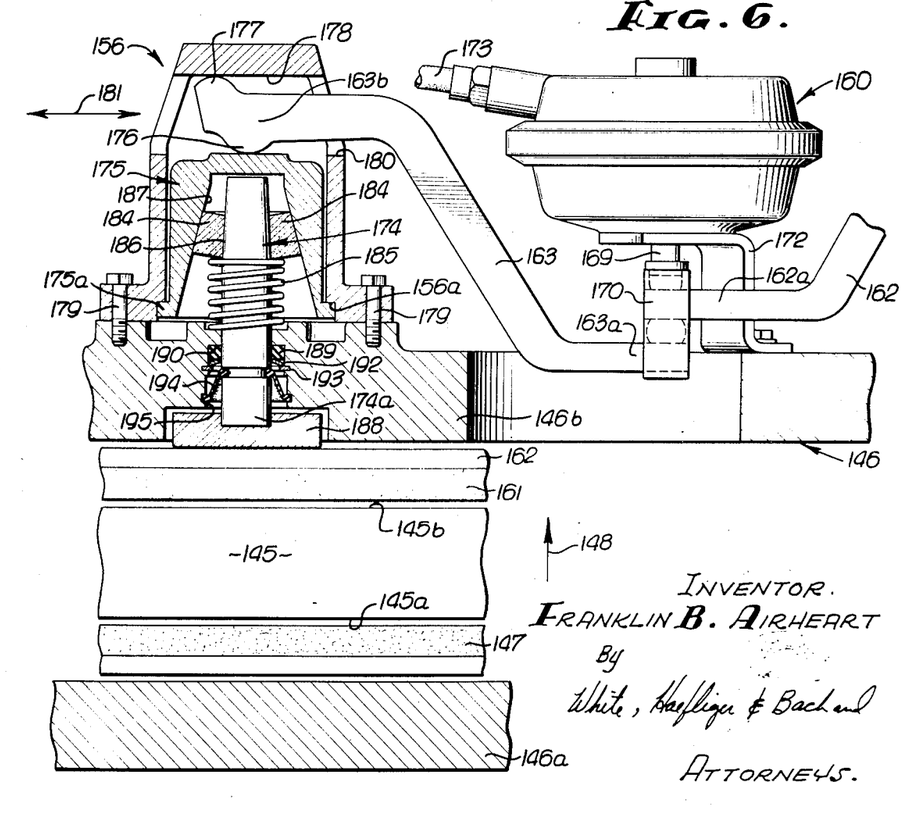
FIG. 6 is a section on lines 6—6 of FIG. 4.

Concerning the referred to lever structure, FIGS. 4, 6 and 8 illustrate levers 162 and 163 respectively extending from a common locus proximate the actuator 160 to the different locations of the housings 155 and 156. The ends 162a and 163a of the levers remote from those housings are operatively connected to the actuator 260 by connection structure that includes dished bearing surfaces as indicated at 164, 165 and 166. A ball bearing 167 is retained between surfaces 164 and 165, and the rounded nose 168 of bearing plunger 169 engages surface 166. A holder 170 has turned ends 171 and 171a to retain these elements in assembled and relatively sliding relation as the plunger 169 is advanced downwardly to effect lever pivoting. The actuator 160 may be suitably connected to the caliper structure 146 as for example by bracket 172. An air pressure line for the pneumatic actuator 160 is shown at 173.

As referred to above, the adjustor includes relatively movable force transmitting parts, braking force being transmissible for example to one such part (as for example is seen at 174 in FIG. 6), via another such part (as for example appears at 175 in FIG. 6), the lever 163 transmitting multiplied force to part 175. In this regard, the lever end portion 163b has associated pivots at 176 and 177. Part 175 is slidably engaged by pivot 176, and the cap-like housing 156 which receives part 175 has an inner surface 178 which engages the second pivot 177. Housing 156 is suitably attached at 179 to the caliper body 146, and has a side opening 180 to pass the lever. Part 175 is movable downwardly in response to clockwise pivoting of the lever 163 about the fulcrum point provided by inner surface 178, and it will be noted that the lever end 163b is free to move slightly laterally in the direction of arrows 181 as such pivoting occurs. Accordingly, multiplied force is transmitted to the adjustor part 175.

Braking force is transmissible from sleeve part 175 to rod part 174 via like wedges 184 urged by spring 185 into adjustable wedging interengagement with the differentially tapered surfaces 186 and 187 of the two parts. Accordingly, part 174 moves downwardly with part 175 to transmit braking force to pad 161 via plate 188 connected to the end 174a of part 174 and plate 162, these two plates for example being interconnected. A grip ring or element 189 frictionally grips one of the parts, as for example via part 174 which the ring surrounds, to limit retraction of that part when braking force is released, lever 163 then pivoting counterclockwise. In this regard, ring 189 may engage shoulder 190 to so limit rod retraction. Spring 185 continues to transmit force urging the wedges and part 175 upwardly, so that any upward movement of part 175 relative to part 174 is compensated by upward movement of the wedges to maintain the braking force intercoupling of the parts 175 and 174. Such relative movement of those parts in a retraction direction compensates for wear of pads 161 and 147, whereby the degree of pivoting of the lever 163 by actuator plunger 169 need not increase to substantial extent as such wear occurs.

In this regard, sufficient braking force transmission to rod part 174 effects its downward slippage through the grip ring whose downward movement is blocked by collapse of Belleville spring 192 against stop ring 193. That slippage occurs due to wear of the brake pads. A dust seal 194 seals off between the rod part 174 and the caliper bore 195, as shown. Shoulder 156a limits upward movement of sleeve flange 175a.

The simultaneous operation of lever 162 to effect braking at location 155 may involve the use of similar braking and force transmitting means as discussed in FIG. 6.

Figure 5:
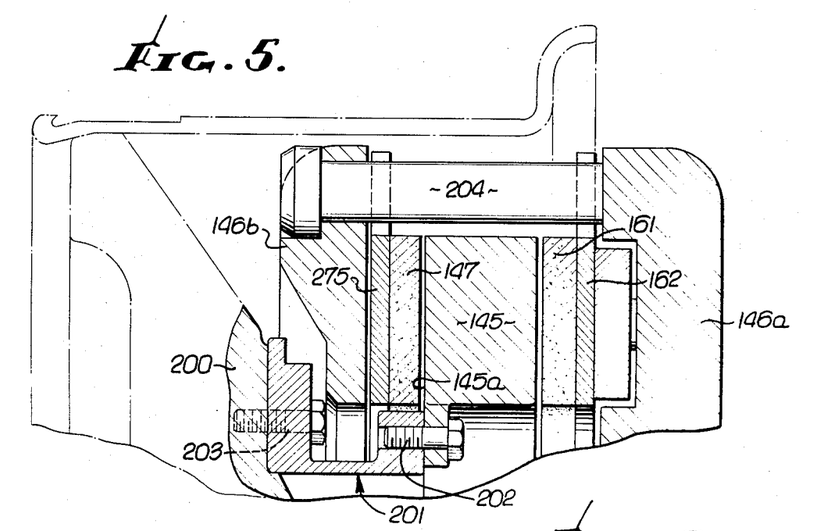
FIG. 5 is a section on lines 5—5 of FIG. 4.

FIG. 5 illustrates the attachment of the disc 145 to wheel structure 200, via bracket means 201 and bolted connections 202 and 203. Bolts 204 carried by caliper body sections 146a and 146b slidably support plate 162 and 275 to which brake linings 161 and 147 are attached.

In FIG. 9, a modified pneumatic actuator 260 in the form of a double diaphragm spring brake, which may be substituted for actuator 160, includes body shell sections 261, 262 and 263 interconnected by clamps 268 and 269. Section 261 is bracket connected at 264 to the caliper body 146. Levers 162 and 163 are urged downwardly by actuator plunger 265 when sufficient air pressure is applied via line 267 to space 291 at the upper side of lower diaphragm 266 to overcome spring 270. Plate 271 transmits such pressure from the diaphragm to the rod 265, compression spring 270 resisting downward deflection and returning the rod to the position shown when air pressure is released. A source of such air pressure appears at 272 and is connected with space 291 via line 267 and brake control valve 273.

System air pressure 272 is at all times applied to space 274 below upper diaphragm 275 and sealed off at 276 from the space 291. Pressure in space 274 plus the force of compression spring 277 acts to hold a heavy-duty compression spring 278 in collapsed condition between the upper shell section 263 and a flange 279 on a slidable member 280. Should system pressure fail, heavy duty spring 278 will expand to displace diaphragm 275, plate 281 and central rod 282 downwardly, urging rod 265 downwardly to actuate the levers and apply the brake linings to the brake disc. Valve 283 in supply line 284 to space 274 may be closed to effect operation of the brake, as described. Alternatively, a cap 285 threaded on body section neck 286 may be turned to advance rod 287 downwardly and thereby effect manual application of the brake.

I claim:

1. In a disc brake assembly, the combination comprising
   a. actuator means to apply external force,
   b. braking structure movable toward and away from a side of the disc, and
   c. force transmitting means including a lever having coupling to said braking structure to provide mechanical advantage of force transmission from the actuator means to the braking structure to urge said structure against the disc in response to lever pivoting,
   d. said means including a motion adjustor responsive to lever pivoting for shifting said coupling to compensate said force transmitting means for wear of the braking structure,
   e. the actuator means comprising a pneumatic cylinder and a pneumatic pressure responsive piston therein and operatively connected to the lever.

2. The combination of claim 1 wherein said adjustor includes relatively movable parts in the direct path of force transmission from the lever to said braking structure.

3. The combination of claim 2 wherein said actuator includes a grip element frictionally gripping one of said parts movable with the braking structure to limit retraction of said structure, said structure, one part and element being movable toward the disc in response to lever pivoting, and said structure and one part also being movable toward the disc and relative to said grip element.

4. In a disc brake assembly, the combination comprising
   a. actuator means to apply external force, b. braking structure movable toward and away from a side of the disc, c. force transmitting means including a lever having coupling to said braking structure to provide mechanical advantage of force transmission from the actuator means to the braking structure to urge said structure against the disc in response to lever pivoting, d. said means including a motion adjustor for shifting said coupling to compensate said force transmitting means for wear of the braking structure, said adjustor including relatively movable parts in the direct path of force transmission from the lever to said braking structure, a grip element frictionally gripping one of said parts movable with the braking structure to limit retraction of said structure, said structure one part and element being movable toward the disc in response to lever pivoting, and said structure and one part also being movable toward the disc and relative to said grip element, and e. another of said parts being movable with the lever, there being a wedge and yieldable means urging said wedge into adjustable wedging interengagement with said parts whereby braking force is transmissible between the parts via the wedge.

5. The combination of claim 1 wherein braking force is transmissible to one of said parts via another of said parts with respect to which said one part is relatively movable, the lever transmitting force to said other part.

6. In a disc brake assembly, the combination comprising a. actuator means to apply external force, b. braking structure movable toward and away from a side of the disc, and c. force transmitting means including a lever having coupling to said braking structure to provide mechanical advantage of force transmission from the actuator means to the braking structure to urge said structure against the disc in response to lever pivoting, d. said means including a motion adjustor for shifting said coupling to compensate said force transmitting means for wear of the braking structure, said adjustor including relatively movable parts in the direct path of force transmission from the lever to said braking structure, said braking force being transmissible to one of said parts via another of said parts with respect to which said one part is relatively movable, the lever transmitting force to said other part, e. said lever having associated pivots, said other part engaging a first of the pivots and there being auxiliary structure engaging a second of the pivots, said pivots being proximate one end of the lever.

7. The combination of claim 1 including a caliper mounting said braking structure at one side of the disc, and also mounting said actuator means and force transmitting means.

8. In a disc brake assembly, the combination comprising a. actuator means to apply external force, b. braking structure movable toward and away from a side of the disc, c. force transmitting means including a lever having coupling to said braking structure to provide mechanical advantage of force transmission from the actuator means to the braking structure to urge said structure against the disc in response to lever pivoting, d. said means including a motion adjustor for shifting said coupling to compensate said force transmitting means for wear of the braking structure, e. a caliper mounting said braking structure at one side of the disc, and also mounting said actuator means and force transmitting means, and f. said force transmitting means including a second lever having second coupling to said braking structure to provide mechanical advantage of force transmission form the actuator means to the braking structure to urge said structure against the disc in response to lever pivoting, the actuator means being operatively connected to both levers to pivot them simultaneously.

9. The combination of claim 8 wherein said actuator means comprises a pneumatic actuator.

10. The combination of claim 9 wherein said actuator means includes an element movable in response to application of air pressure thereto to effect pivoting of the lever, and a spring yieldably resisting said element movement.

11. The combination of claim 1 wherein said lever has a pivot and wherein said adjustor is operatively connected with said pivot.

12. The combination of claim 11 wherein said pivot is outside the direct path of force transmission form the lever to said structure.

13. The combination of claim 8 wherein the ends of the levers remote from the coupling thereof to the braking structures are operatively connected to the actuator means by connection structure that includes bearing surfaces.

14. In a disc brake assembly, the combination comprising a. actuator means to apply external force, b. braking structure movable toward and away form a side of the disc, c. force transmitting means including a lever having a pivot and operable to provide mechanical advantage or force transmission from the actuator means to said braking structure to urge said structure against the disc in response to lever pivoting, and d. means to effect shifting of the lever pivot in a direction to compensate said force transmitting means for wear of the braking structure, e. the actuator means comprising a fluid pressure cylinder and a fluid pressure responsive piston therein and operatively connected to the lever.

15. In a disc brake assembly, the combination comprising a. actuator means to apply external force, b. braking structure movable toward and away from a side of the disc, c. force transmitting means including a lever having a pivot and operable to provide mechanical advantage of force transmission from the actuator means to said braking structure to urge said structure against the disc in response to lever pivoting, and d. means to effect shifting of the lever pivot in a direction to compensate said force transmitting means for wear of the braking structure, e. said lever being pivotable in braking structure advancing and retracting directions, and said last named means including mechanism operable to restrain retraction of said braking structure away from said side of the disc in response to lever pivoting in said retracting direction.

16. The combination of claim 15 wherein said mechanism comprises a grip element frictionally gripping a part movable with the braking structure to limit retraction of said structure, said structure, part and element being movable toward the disc and in response to lever pivoting, and said structure and part also being movable toward the disc and relative to said element.

17. The combination of claim 16 including yieldable means urging the lever in a retraction direction.

18. The combination of claim 15 wherein the lever is operatively connected to the brake structure at a second pivot spaced from the first pivot and characterized in that the first pivot acts a a fulcrum when the lever pivots in an advancing direction and the second pivot acts as a lever fulcrum when the lever pivots in a retraction direction with said mechanism then restraining retraction of the braking structure.

19. The combination of claim 18 wherein said means to effect shifting of the first mentioned pivot comprises an adjustor responsive to lever pivoting in said retraction direction.

20. The combination of claim 19 wherein said adjustor comprises a ratchet.

21. The combination of claim 19 wherein said adjustor is manually adjustable.

22. The combination of claim 14 including a caliper carrying said lever and braking structure, the caliper forming a space in which the brake disc is adapted to extend.

23. In a disc brake assembly, the combination comprising
a. actuator means to apply external force,
b. braking structure movable toward and away from a side of the disc,
c. force transmitting means including a lever having a pivot and operable to provide mechanical advantage of force transmission from the actuator means to said braking structure to urge said structure against the disc in response to lever pivoting,
d. means to effect shifting of the lever pivot in a direction to compensate said force transmitting means for wear of the braking structure,
e. a caliper carrying said lever and braking structure, the caliper forming a space in which the brake disc is adapted to extend, and
f. said braking structure being movable relative to the caliper in response to lever pivoting, there being other brake structure carried by the caliper to engage the side of the disc opposite said first mentioned brake structure and in response to shifting of the caliper relative to the disc.

24. In a disc brake assembly, the combination comprising
a. actuator means to apply external force,
b. braking structure movable toward and away from a side of the disc,
c. force transmitting means including a lever having a pivot and operable to provide mechanical advantage of force transmission form the actuator means to said braking structure to urge said structure against the disc in response to lever pivoting, and
d. means to effect shifting of the lever pivot in a direction to compensate said force transmitting means for wear of the braking structure,
e. said actuator means comprising a fluid pressure cylinder and a fluid pressure responsive piston therein and operatively connected to the lever.

25. The combination of claim 14 including an air pressure supply duct communicating with said cylinder.

26. The combination of claim 23 wherein said actuator means comprises an air pressure cylinder integral with the caliper, and an air pressure responsive piston in said cylinder and operatively connected with said lever to pivot the lever in an advancing direction.

27. The combination of claim 26 including a retractor spring operatively connected with the lever to urge the lever in said retracting direction.

28. In a disc brake assembly, the combination comprising
a. actuator means to apply external force,
b. braking structure movable toward and away from a side of the disc, and
c. force transmitting means including a lever having coupling to said braking structure to provide mechanical advantage of force transmission from the actuator means to the braking structure to urge said structure against the disc in response to lever pivoting,
d. said means including a motion adjustor for shifting said coupling to compensate said force transmitting means for wear of the braking structure,
e. said actuator means comprising a pneumatic actuator having first and second sections, a diaphragm in the first section being air pressure displaceable to transmit braking force, there being a heavy duty spring and a diaphragm in the second section which is air pressure displaceable to block braking force transmission by the heavy duty spring whereby sufficient reduction of air pressure application to the second diaphragm permits expansion of said spring to effect auxiliary braking force transmission.

29. In a disc brake assembly, the combination comprising
a. a braking element movable relatively toward and away from one side of the disc,
b. an actuator,
c. force transmitting means including a lever interconnecting the actuator and element to provide mechanical advantage of force transmission from the actuator to said element acting to urge the element relatively toward and against the disc in response to lever pivoting in a brake element advancing direction,
d. means to resist displacement of the braking structure relatively away from the disc in response to lever pivoting in a brake element retracting direction,
e. fulcrum for the lever, and
f. compensating means operatively connected with said force transmitting means and responsive to lever pivoting to compensate pivoting of the lever in predetermined relation to the brake element, g. the actuator comprising a pneumatic cylinder and a pneumatic pressure responsive piston therein and operatively connected to the lever.

* * * * *